(12) United States Patent
Parrott

(10) Patent No.: US 7,270,348 B2
(45) Date of Patent: Sep. 18, 2007

(54) RELEASABLE CONNECTOR INCLUDING SWIVEL

(75) Inventor: David G. Parrott, Escondido, CA (US)

(73) Assignee: Apical Industries, Inc., Oceanside, CA (US)

( * ) Notice: Subject to any disclaimer, the term of this patent is extended or adjusted under 35 U.S.C. 154(b) by 163 days.

(21) Appl. No.: 10/974,252

(22) Filed: Oct. 27, 2004

(65) Prior Publication Data

US 2006/0055171 A1   Mar. 16, 2006

Related U.S. Application Data

(60) Provisional application No. 60/529,189, filed on Dec. 12, 2003.

(51) Int. Cl.
*F16L 27/00* (2006.01)

(52) U.S. Cl. ............... 285/276; 285/275; 285/308
(58) Field of Classification Search ............... 285/95, 285/120.1, 121.1, 121.6, 123.12, 223, 276, 285/275, 305, 308, 321
See application file for complete search history.

(56) References Cited

U.S. PATENT DOCUMENTS

| 1,116,387 | A | * | 11/1914 | Coda ................... 48/180.1 |
| 2,518,443 | A | * | 8/1950 | Bagnard ................. 285/16 |
| 2,549,951 | A | * | 4/1951 | Warren .................. 285/94 |
| 3,148,897 | A | * | 9/1964 | Hurt et al. .............. 285/98 |
| 4,079,969 | A | * | 3/1978 | Wilson et al. ........... 285/98 |
| 4,749,192 | A | * | 6/1988 | Howeth ................. 285/86 |
| 4,804,206 | A | * | 2/1989 | Wood et al. ............ 285/13 |
| 4,817,996 | A |   | 4/1989 | Fouts |
| 5,115,836 | A | * | 5/1992 | Carow et al. ......... 137/614.04 |
| 5,845,944 | A |   | 12/1998 | Enger et al. |
| 6,302,445 | B1 | * | 10/2001 | Kugele et al. ............ 285/5 |

* cited by examiner

*Primary Examiner*—Aaron Dunwoody
*Assistant Examiner*—Fannie C. Kee
(74) *Attorney, Agent, or Firm*—Peter K. Hahn; Luce, Forward, Hamilton & Scripps, LLP

(57) ABSTRACT

A connector for releasably attaching a pair of conduits includes male and female components having proximal and distal ends and a lumen, and a swivel connection releasably connecting the male and female components. The swivel connection permits fluid communication between the male and female components and also permits free rotation between the male and female components.

9 Claims, 2 Drawing Sheets

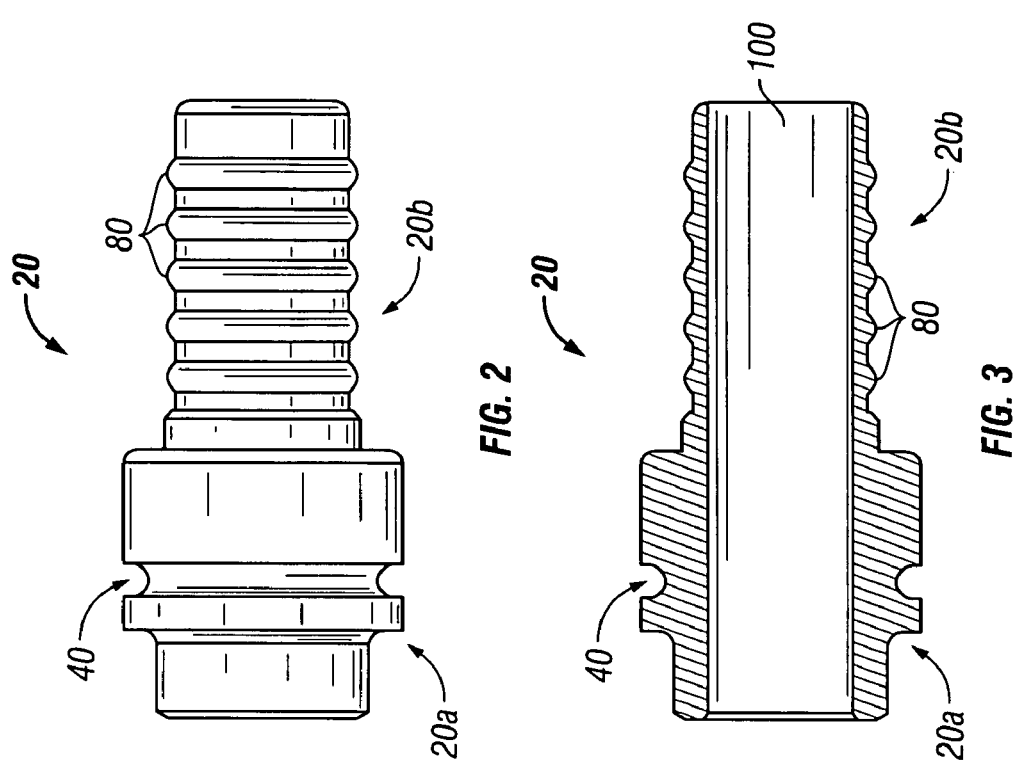
FIG. 2
FIG. 3
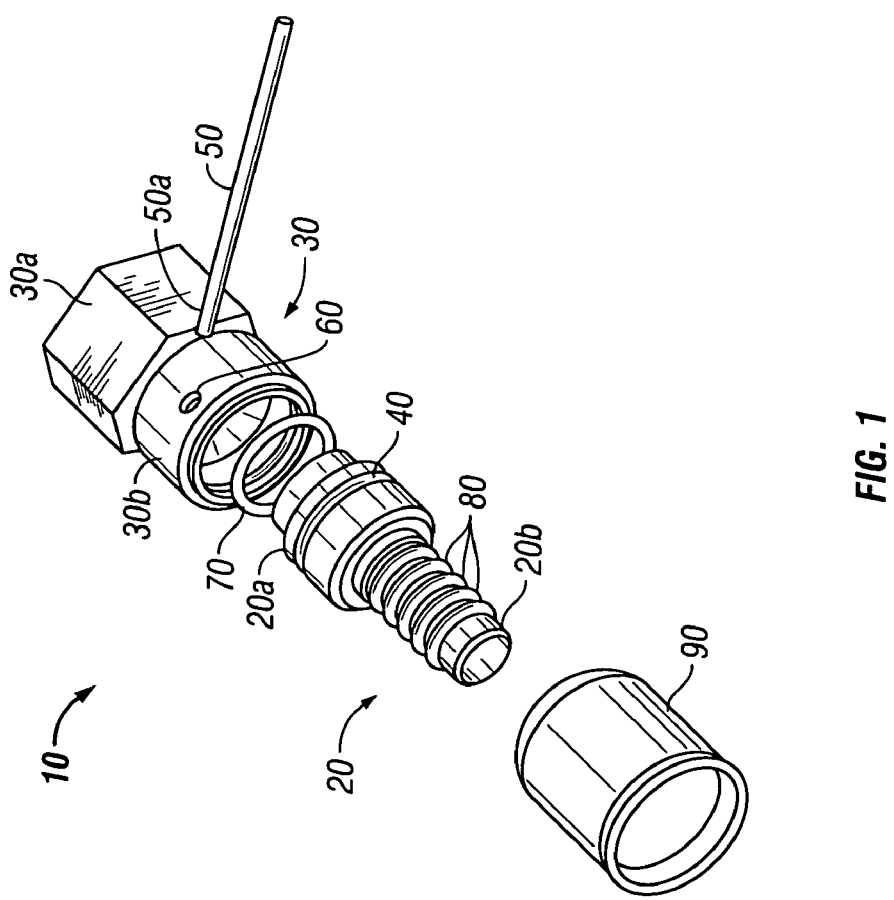
FIG. 1

RELEASABLE CONNECTOR INCLUDING SWIVEL

REFERENCE TO RELATED APPLICATIONS

Priority is claimed to U.S. Provisional Application Ser. No. 60/529,189, filed Dec. 12, 2003, titled "Releasable Connector Including Swivel," which is incorporated herein by reference in its entirety.

FIELD OF THE INVENTION

The present invention is directed to a connector, and more particularly, to a releasable connector for connecting a pair of conduits, the connector including a swivel that permits rotation between the conduits.

BACKGROUND OF THE INVENTION

Connectors or couplings comprising quick-release mechanisms for attaching hoses and other types of conduits are known. Such connectors typically comprise a male coupling component which is connected to a first conduit and a female coupling component which is connected to a second conduit, wherein the male coupling component can be rapidly inserted into and rapidly withdrawn from the female coupling component.

A disadvantage of using a conventional quick-release connector to attach a pair of conduits is that the conduits may become inadvertently twisted, tangled or kinked due to the inability of the connector to permit the rotation of one conduit with respect to the other conduit. Of course, this may hinder the displacement of fluids or other materials through the conduits.

In view of the drawbacks of using a conventional connector to attach a pair of conduits, there exists a need for a quick-release connector for a releasably attaching a pair of conduits, wherein the connector includes a swivel that permits free rotation between the conduits.

BRIEF DESCRIPTION OF THE DRAWINGS

FIG. 1 is an exploded view of a releasable connector including a swivel in accordance with the principles of the present invention;

FIG. 2 is a side view of a component of the releasable connector of FIG. 1;

FIG. 3 is a cross-sectional view of the component of FIG. 2;

DETAILED DESCRIPTION OF THE PREFERRED EMBODIMENTS

Figure 6:
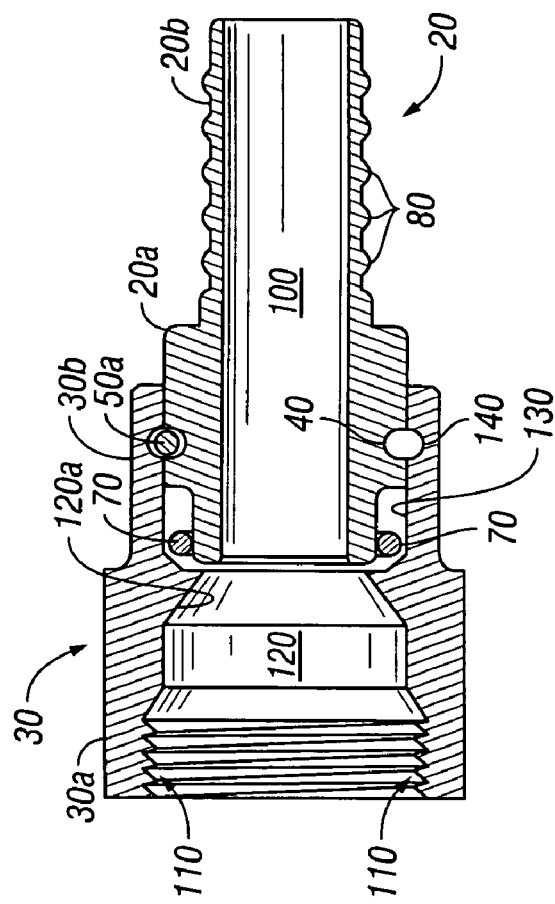
FIG. 6 is a cross-sectional view of the interconnected components of FIGS. 2 and 4.

The present invention provides an apparatus for releasably connecting a pair of fluid conduits, wherein the apparatus including a connector having a swivel that permits rotation between the fluid conduits. These fluid conduits may be used for the displacement of fluids, liquids, gases, substantially solid materials, gels, foams and combinations thereof. The connector may further comprise a quick release connection to allow the conduits to break free of each other, for example during an emergency.

According to an exemplary embodiment of the invention, the conduits are part of an emergency system for filling an emergency floatation device with compressed gas from a canister. During an emergency, conduits that are attached using a conventional connector may become inadvertently twisted, tangled or kinked, which may prevent deployment of the emergency floatation device. Advantageously, the connector of the present invention includes a swivel that permits free rotation between the conduits, which prevents inadvertent twisting, tangling and kinking, thereby allowing unfettered deployment of the emergency floatation device.

According to a further exemplary embodiment of the invention, the connector may be employed as a quick release connection between a faucet and a conduit such as a hose. Similar to the previous embodiment, the quick release connection comprises a swivel that permits rotation of the hose relative to the faucet, thus preventing twisting, tangling and kinking of the hose that may otherwise occur. As would be understood to those of ordinary skill in the art, the connector may be used as part of other hydraulic or fluid systems without departing from the scope of the present invention.

Referring to FIG. 1, in accordance with the principles of the present invention, a releasable connector 10 including a swivel is now described. Releasable connector 10 comprises a male component 20 having proximal end 20*a* and distal end 20*b*, and a female component 30 having proximal end 30*a* and distal end 30*b*. Proximal end 20*a* of male connector 20 preferably is dimensioned to fit within distal end 30*b* of female connector 30 and held in place using a swivel connection 40,50 that permits rotation between the male and female connectors.

According to a preferred embodiment of the invention, swivel connection 40,50 comprises a substantially circular notch 40 in male component 20 in combination with a pin 50 that is dimensioned to pass through an aperture 60 in the female component 30 and into the notch 40. When pin 50 is inserted into notch 40 (via aperture 60), the male and female components 20,30 are locked together in fluid communication. However, due to the substantially circular configuration of the notch, male component 20 is freely rotatable with respect to female component 30. In other words, pin 50 may move around the circumference of the male component within notch 40. Pulling the pin 50 from the notch 40 releases the swivel connection. In the illustrated embodiment, notch 40 extends around the entire circumference of the male component 20 such that the male component 20 may be freely rotated with respect to the female component 30. According to other embodiments, the notch may be structured to extend around only a portion of the circumference of the male component to permit a limited or controlled amount of rotation between components.

With further reference to FIG. 1, connector 10 may also comprise an o-ring seal 70 disposed between the male and female components 20,30 for preventing or limiting fluid leakage between components. Additionally, distal end 20*b* of male connector 20 may comprise a plurality of spaced-apart, ring-shaped projections 80 dimensioned to facilitate attachment to a conduit such as a hose or other conduit. A crimp 90 is further provided to secure the conduit to the distal end 20*b* of the male connector 20 around ring-shaped projections 80.

Referring to FIGS. 1-3, notch 40 preferably comprises a groove or channel that extends around proximal end 20*a* of male connector 20. Notch 40 is dimensioned to receive a distal tip 50a of the pin 50 after the tip passes through aperture 60, thereby locking the male and female components 20,30 together. Pin tip 50a and notch 60 may be correspondingly tapered or curved to facilitate movement of the tip 50a within slot 60 by reducing frictional forces. In addition, a lubricant may be used to further reduce friction between the pin tip 50a and the notch. Suitable lubricants include, but are not limited to, oils, silicon oils, and other lubricants. As depicted in FIG. 3, male connector 20 includes a lumen 100 for the passage of fluids, such as gases and/or liquids.

Figure 4:
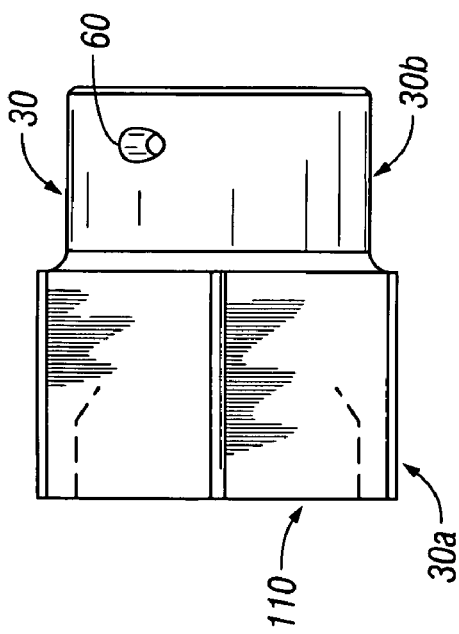
FIG. 4 is a side view of another component of the releasable connector of FIG. 1.
Figure 5:
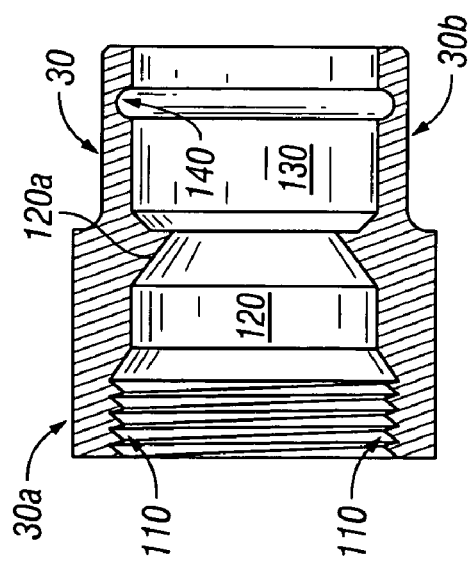
FIG. 5 is a cross-sectional view of the component of FIG. 4.

Referring to FIGS. 4 and 5, proximal end 30a of female connector 30 may comprise internal threads 110 to facilitate attachment to another conduit. By way of example, the proximal end 30a of the female connector 30 may be threadably attached to a conduit such as a conventional faucet or hose. In the illustrated embodiment, proximal end 30a of female connector 30 is shaped like a conventional nut to facilitate tightening, for example using a tool such as a wrench. Female connector 30 further comprises a lumen 120 that is in fluid communication with lumen 100 in male connector 20. In addition, distal end 30b of female connector 30b includes an opening 130 dimensioned to receive the proximal end 20a of the male connector 20.

Referring to FIG. 5, it may be desirable for machining purposes to include a notch 140 disposed within opening 130, such that notch 140 is in communication with aperture 60 to facilitate insertion of pin 50. In a preferred configuration, notch 140 extends around the inside diameter of end 30b such that when pin 50 is forcibly inserted into aperture 60, it is forced to deform to the curvilinear shape defined by notches 40 and 140. Once the pin is inserted and deformed, it is held in place within notches 40 and 140 by frictional forces. Pin 50 may also be held in place by other conventional means such as welding, press fitting, gluing and/or friction fitting. Pin 50 preferably enters female connector 30 such that pin 50 is substantially tangential to notch 40. A proximal end of pin 50 may include a ball or loop portion to facilitate gripping by a user.

According to some embodiments of the present invention, it may be desirable to substantially permanently hold the connector together. In this instance, it is desirable to cut or grind off the pin once it is inserted into notch 40 such that the pin is substantially flush with the outer surface of the connector. According to some embodiments, it may be desirable to only temporarily hold the connector together. In this instance, the pin is permitted to extend out from the surface of the connector, thereby providing a quick-release mechanism wherein a user may disconnect the components by grasping the pin and pulling it out of the slot.

Referring to FIG. 6, in a locked configuration, proximal end 20a of male component 20 is disposed within distal end 30b of the female component such that notch 40 is substantially aligned with notch 140 within opening 130. This alignment facilitates insertion of pin tip 50a into notch 40 to lock the components in place, yet permits rotation of the male and female components 20,30 with respect to one another. Lumen 120 optionally includes a tapered wall 120a that facilitate fluid flow from the female connector 30 into the male connector. O-ring seal 70 prevents unnecessary fluid loss between the components.

Male and female components 20,30 of the connector of the present invention are preferably made from strong, durable materials such as metals and/or plastics. Suitable materials include stainless steel, aluminum, polyvinyl chloride and polyethylene. As would be understood by those of ordinary skill in the art, these components may be fabricated from any number of alternative materials without departing from the scope of the present invention.

Thus, it is seen that a releasable connector including a swivel is provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

What is claimed is:

1. A connector for releasably attaching a pair of conduits, the connector comprising:
   a male component having proximal and distal ends, a notch disposed around a perimeter of the proximal end, and a male component lumen;
   a female component having a female component lumen, a proximal and a distal end dimensioned to receive the proximal end of the male component, and an aperture in the distal end; and
   a swivel connection releasably connecting the male and female components,
   wherein the swivel connection permits fluid communication between the male and female components and permits free rotation between the male and female components,
   wherein the swivel connection comprises a pin that passes through the aperture and into the notch,
   wherein the proximal end of the female component is internally threaded to facilitate attachment to a first conduit, and
   wherein the distal end of the male component includes a plurality of spaced apart rings to facilitate attachment to a second conduit.

2. The connector of claim 1 wherein pulling the pin from the notch releases the swivel connection.

3. The connector of claim 1, wherein the female component lumen includes a tapered wall to facilitate fluid flow from the female component into the male component.

4. The connector of claim 1, wherein the male and female components are made from stainless steel or aluminum.

5. The connector of claim 1, wherein the swivel connection between the male and female components is fluid-tight.

6. A connector for releasably attaching a pair of conduits, the connector comprising:
   a male component having proximal and distal ends, a male component lumen and a notch disposed around the perimeter of the proximal end;
   a female component having a female component lumen, a proximal and a distal end dimensioned to receive the proximal end of the male component, and an aperture in the distal end; and
   a swivel connection releasably connecting the male and female components;
   wherein the swivel connection permits fluid communication between the male and female components and permits free rotation between the male and female components,
   wherein the proximal end of the female component is internally threaded to facilitate attachment to a first conduit,
   wherein the distal end of the male component includes a plurality of spaced apart rings to facilitate attachment to a second conduit, wherein the swivel connection comprises a pin that passes through the aperture and into the notch, and
wherein the notch is tapered to reduce frictional forces between the pin and notch.

7. The connector of claim 6, wherein the female component lumen includes a tapered wall to facilitate fluid flow from the female component into the male component.

8. The connector of claim 6, wherein the male and female components are made from stainless steel or aluminum.

9. The connector of claim 6, wherein the swivel connection between the male and female components is fluid-tight.

* * * * *